US011932828B2

(12) United States Patent
Billiauw et al.

(10) Patent No.: US 11,932,828 B2
(45) Date of Patent: Mar. 19, 2024

(54) LIQUID HAND DISHWASHING CLEANING COMPOSITION WITH AN ALKYL ALXOXY SULFATE HAVING A C13/C12 RATIO OF 65/35 TO 80/20

(71) Applicant: The Procter & Gamble Company, Cincinnati, OH (US)

(72) Inventors: Jan Julien Marie-Louise Billiauw, Gentbrugge (BE); Kristof Crets, Brussels (BE); Phillip Kyle Vinson, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 10 days.

(21) Appl. No.: 17/546,432

(22) Filed: Dec. 9, 2021

(65) Prior Publication Data

US 2022/0098517 A1 Mar. 31, 2022

Related U.S. Application Data

(63) Continuation of application No. 16/587,223, filed on Sep. 30, 2019, now Pat. No. 11,225,630.

(30) Foreign Application Priority Data

Oct. 4, 2018 (EP) .................................... 18198524

(51) Int. Cl.

| | |
|---|---|
| ***C11D 1/29*** | (2006.01) |
| ***B08B 3/08*** | (2006.01) |
| ***C11D 1/94*** | (2006.01) |
| *C11D 1/14* | (2006.01) |

(52) U.S. Cl.

CPC .................. *C11D 1/94* (2013.01); *B08B 3/08* (2013.01); *C11D 1/146* (2013.01); *C11D 2111/14* (2024.01)

(58) Field of Classification Search

CPC ........... C11D 1/29; C11D 3/0094; C11D 1/75; C11D 1/90

See application file for complete search history.

(56) References Cited

U.S. PATENT DOCUMENTS

| | | | | |
|---|---|---|---|---|
| 11,225,630 | B2 | 1/2022 | Billiauw et al. | |
| 2009/0014029 | A1 | 1/2009 | Borne | |
| 2009/0124531 | A1 | 5/2009 | Danziger | |
| 2011/0259365 | A1 | 10/2011 | Schuetz et al. | |
| 2011/0312869 | A1* | 12/2011 | Danziger | C11D 3/3723 510/357 |
| 2013/0324451 | A1 | 12/2013 | Dobrawa et al. | |
| 2014/0221266 | A1* | 8/2014 | Keuleers | C11D 1/94 510/235 |
| 2015/0203799 | A1 | 7/2015 | Bettiol et al. | |
| 2016/0130536 | A1 | 5/2016 | Jones et al. | |
| 2017/0015943 | A1 | 1/2017 | Braeckman | |
| 2017/0175039 | A1 | 6/2017 | Delplancke | |

FOREIGN PATENT DOCUMENTS

| | | | |
|---|---|---|---|
| EP | 0554991 | A1 | 8/1993 |
| EP | 2014753 | A1 | 1/2009 |
| GB | 1532899 | A | 11/1978 |
| JP | 2004072395 | A | 3/2004 |
| JP | 2010248404 | A | 11/2010 |
| WO | 9635770 | A1 | 11/1996 |

OTHER PUBLICATIONS

ALFOL Sasol's C12-C13 Alcohols, Retrieved from Internet on Apr. 8, 2019: :http://www.sasoltechdata.com/MarketingBrochures/C1213%20Alc.pdf, Oct. 17, 2011, 1 page.
All Office Actions; U.S. Appl. No. 16/587,223, filed Sep. 30, 2019.
Extended EP Search Report and Search Opinion for 18198524.3 dated Apr. 15, 2019 9 pages.

* cited by examiner

*Primary Examiner* — Charles I Boyer
(74) *Attorney, Agent, or Firm* — Carolyn S. Powell; George H. Leal

(57) ABSTRACT

The need for a liquid hand-dishwashing composition which provides further improved sudsing volume and longevity when washing dishware using diluted liquid hand dishwashing compositions, especially in the presence of greasy soil and particulate soil, while still providing the desired cleaning, is met when the composition is formulated with a surfactant system comprising a specific level of alkyl sulfate surfactant and a co-surfactant, when the alkyl chain of the alkyl sulfate anionic surfactant has a mol fraction of C12 and C13 chains of at least about 50%, and the C13/C12 mol ratio of the alkyl chain is at least about 57/43.

18 Claims, No Drawings

LIQUID HAND DISHWASHING CLEANING COMPOSITION WITH AN ALKYL ALXOXY SULFATE HAVING A C13/C12 RATIO OF 65/35 TO 80/20

FIELD OF THE INVENTION

The present invention relates to a liquid hand dishwashing cleaning composition.

BACKGROUND OF THE INVENTION

During manual dishwashing in a sink full of water into which a cleaning composition has been diluted, the user typically relies on the level of suds to indicate the remaining cleaning efficacy of the diluted cleaning composition. A high suds volume and/or stable, long-lasting suds longevity (i.e., mileage) indicates to the user that sufficient active ingredients (e.g., surfactants) remain, in order to perform the desired cleaning. Poor suds longevity typically leads to the user dosing additional cleaning composition even when cleaning efficacy remains.

Anionic surfactants have been used to provide suds during dishwashing, with alkyl sulfate and alkyl alkoxy sulfates having a high proportion of C12 and C13 chains being found to be particularly effective at providing improved sudsing in addition to the desired cleaning. Such sulphated surfactants can be derived from synthetic alcohols, such as OXO-alcohols and Fisher Tropsh alcohols. Fractionation can be used to increase the proportion of C12 and C13 alkyl chain.

The suds volume and longevity are significantly affected by the presence of greasy or particulate soils, especially when high levels of both greasy and particulate soils are present in the dish-washing liquor. Often, methods of formulating to improve suds mileage in the presence of greasy soils leads to reduced suds mileage in the presence of particulate soils, and vice-versa.

Hence, there remains a need to further improve the sudsing volume and longevity when washing dishware using diluted liquid hand dishwashing compositions, especially in the presence of greasy soil and particulate soil, while still providing the desired cleaning.

SUMMARY OF THE INVENTION

The present invention relates to a liquid hand dishwashing cleaning composition comprising from 5% to 50% by weight of the total composition of a surfactant system, wherein the surfactant system comprises: from 60% to 90% by weight of the surfactant system of alkyl sulfate anionic surfactant selected form the group consisting of: alkyl sulfate, alkyl alkoxy sulfate, and mixtures thereof; and a co-surfactant selected from the group consisting of an amphoteric surfactant, a zwitterionic surfactant and mixtures thereof; characterised in that the alkyl chain of the alkyl sulfate anionic surfactant has a mol fraction of C12 and C13 chains of at least 50%, preferably at least 65%, more preferably at least 80%, most preferably at least 90%, and wherein the C13/C12 mol ratio of the alkyl chain of the alkyl sulfate anionic surfactant is at least 57/43, preferably from 60/40 to 90/10, more preferably from 60/40 to 80/20, most preferably from 60/40 to 70/30 The present invention further relates to a method of manually washing dishware comprising the steps of: delivering the composition of the invention to a volume of water to form a wash solution and immersing the dishware in the solution, and to the use of the composition for the stabilization of suds in the presence of greasy and/or particulate soils.

DETAILED DESCRIPTION OF THE INVENTION

The liquid hand dishwashing cleaning compositions of the present invention provide a good sudsing profile, including high suds volume generation and sustained suds stabilization through the dishwashing process, even when in presence of greasy and/or particulate soils. This signals to the user that there remains sufficient active ingredients present to provide continued cleaning performance, as such triggering less re-dosing and overconsumption of the product by the user.

The compositions of the present invention also provide good grease removal, in particular good removal of uncooked grease and particulate soils.

Definitions

As used herein, articles such as "a" and "an" when used in a claim, are understood to mean one or more of what is claimed or described.

The term "comprising" as used herein means that steps and ingredients other than those specifically mentioned can be added. This term encompasses the terms "consisting of" and "consisting essentially of." The compositions of the present invention can comprise, consist of, and consist essentially of the essential elements and limitations of the invention described herein, as well as any of the additional or optional ingredients, components, steps, or limitations described herein.

The term "dishware" as used herein includes cookware and tableware made from, by non-limiting examples, ceramic, china, metal, glass, plastic (e.g., polyethylene, polypropylene, polystyrene, etc.) and wood.

The term "grease" or "greasy" as used herein means materials comprising at least in part (i.e., at least 0.5 wt % by weight of the grease) saturated and unsaturated fats and oils, preferably oils and fats derived from animal sources such as beef, pig and/or chicken.

The terms "include", "includes" and "including" are meant to be non-limiting.

The term "particulate soils" as used herein means inorganic and especially organic, solid soil particles, especially food particles, such as for non-limiting examples: finely divided elemental carbon, baked grease particle, and meat particles.

The term "sudsing profile" as used herein refers to the properties of a cleaning composition relating to suds character during the dishwashing process. The term "sudsing profile" of a cleaning composition includes suds volume generated upon dissolving and agitation, typically manual agitation, of the cleaning composition in the aqueous washing solution, and the retention of the suds during the dishwashing process. Preferably, hand dishwashing cleaning compositions characterized as having "good sudsing profile" tend to have high suds volume and/or sustained suds volume, particularly during a substantial portion of or for the entire manual dishwashing process. This is important as the consumer uses high suds as an indicator that sufficient cleaning composition has been dosed. Moreover, the consumer also uses the sustained suds volume as an indicator that sufficient active cleaning ingredients (e.g., surfactants) are present, even towards the end of the dishwashing process. The consumer usually renews the washing solution when the sudsing subsides. Thus, a low sudsing cleaning composition will tend to be replaced by the consumer more frequently than is necessary because of the low sudsing level.

It is understood that the test methods that are disclosed in the Test Methods Section of the present application must be used to determine the respective values of the parameters of Applicants' inventions as described and claimed herein.

In all embodiments of the present invention, all percentages are by weight of the total composition, as evident by the context, unless specifically stated otherwise. All ratios are weight ratios, unless specifically stated otherwise, and all measurements are made at 25° C., unless otherwise designated.

Cleaning Composition

The cleaning composition is a hand dishwashing cleaning composition in liquid form. The cleaning composition is preferably an aqueous cleaning composition. As such, the composition can comprise from 50% to 85%, preferably from 50% to 75%, by weight of the total composition of water.

Preferably, the pH of the composition is from about 6 to about 14, preferably from about 7 to about 12, or more preferably from about 7.5 to about 10, as measured at 10% dilution in distilled water at 20° C. The pH of the composition can be adjusted using pH modifying ingredients known in the art.

The composition of the present invention can be Newtonian or non-Newtonian, preferably Newtonian. Preferably, the composition has a viscosity of from 10 mPa·s to 10,000 mPa·s, preferably from 100 mPa·s to 5,000 mPa·s, more preferably from 300 mPa·s to 2,000 mPa·s, or most preferably from 500 mPa·s to 1,500 mPa·s, alternatively combinations thereof. The viscosity is measured with a Brookfield RT Viscometer using spindle 21 at 20 RPM at 25° C.

Surfactant System

The cleaning composition comprises from 5% to 50%, preferably from 8% to 45%, most preferably from 15% to 40%, by weight of the total composition of a surfactant system. In order to improve surfactant packing after dilution and hence improve suds mileage, the surfactant system comprises an alkyl sulfate anionic surfactant and a co-surfactant. The alkyl sulfate anionic surfactant to the co-surfactant weight ratio can be from 1:1 to 8:1, preferably from 2:1 to 5:1, more preferably from 2.5:1 to 4:1.

A preferred embodiment of the liquid hand dishwashing cleaning composition comprises from 15% to 40% by weight of the total composition of a surfactant system comprising an anionic surfactant, and an amine oxide co-surfactant, wherein: the anionic surfactant consists of at least one alkyl ethoxy sulfate, or a mixture of at least one alkyl sulfate and at least one alkyl ethoxy sulfate, with a mol fraction of C12 and C13 chains at least 90%, the C13/C12 mol ratio of the alkyl chain of the alkyl sulfate anionic surfactant is from 60/40 to 70/30, an average alkyl chain length of between 12 and 13, an average degree of ethoxylation of between 0.5 and 0.9, and a weight average degree of branching of between 30% and 50%; and the anionic surfactant and amine oxide co-surfactant are in a weight ratio of between 2.5: and 4:1.

Anionic Surfactant

The surfactant system comprises from 60% to 90%, preferably from 65% to 85%, more preferably from 70% to 80% by weight of the surfactant system of alkyl sulfate anionic surfactant selected form the group consisting of: alkyl sulfate, alkyl alkoxy sulfate, and mixtures thereof. Preferred alkyl alkoxy sulfates are alkyl ethoxy sulfates.

The alkyl chain of the alkyl sulfate anionic surfactant has a mol fraction of C12 and C13 chains of at least 50%, preferably at least 65%, more preferably at least 80%, most preferably at least 90%. Suds mileage is particularly improved, especially in the presence of greasy soils, when the C13/C12 mol ratio of the alkyl chain is at least 57/43, preferably from 60/40 to 90/10, more preferably from 60/40 to 80/20, most preferably from 60/40 to 70/30, while not compromising suds mileage in the presence of particulate soils.

The mol average alkyl chain length of the alkyl sulfate anionic surfactant can be from 8 to 18, preferably from 10 to 14, more preferably from 12 to 14, most preferably from 12 to 13 carbon atoms, in order to provide a combination of improved grease removal and enhanced speed of cleaning.

The relative molar amounts of C13 and C12 alkyl chains in the alkyl sulfate anionic surfactant can be derived from the carbon chain length distribution of the anionic surfactant. The carbon chain length distribution of the alkyl chains of the alkyl sulfate anionic surfactants can be obtained from the technical data sheets from the suppliers for the surfactant or constituent alkyl alcohol. Alternatively, the chain length distribution and average molecular weight of the fatty alcohols, used to make the alkyl sulfate anionic surfactant, can also be determined by methods known in the art. Such methods include capillary gas chromatography with flame ionisation detection on medium polar capillary column, using hexane as the solvent. The chain length distribution is based on the starting alcohol and alkoxylated alcohol. As such, the alkyl sulphate anionic surfactant should be hydrolysed back to the corresponding alkyl alcohol and alkyl alkoxylated alcohol before analysis, for instance using hydrochloric acid.

Preferably the alkyl sulfate anionic surfactant has an average degree of alkoxylation of less than 5, preferably less than 3, more preferably less than 2 and more than 0.5, most preferably from 0.5 to 0.9, in order to improve low temperature physical stability and improve suds mileage of the compositions of the present invention. The average degree of alkoxylation is the mol average degree of alkoxylation (i.e., mol average alkoxylation degree) of all the alkyl sulfate anionic surfactant. Hence, when calculating the mol average alkoxylation degree, the mols of non-alkoxylated sulfate anionic surfactant are included:

$$\text{Mol average alkoxylation degree}=(x1*\text{alkoxylation degree of surfactant }1+x2*\text{alkoxylation degree of surfactant }2+\ldots)/(x1+x2+\ldots)$$

wherein x1, x2, . . . are the number of moles of each alkyl (or alkoxy) sulfate anionic surfactant of the mixture and alkoxylation degree is the number of alkoxy groups in each alkyl sulfate anionic surfactant.

Preferred Alkyl Alkoxy Sulfates are Alkyl Ethoxy Sulfates

The alkyl sulfate anionic surfactant can have a weight average degree of branching of more than 10%, preferably more than 20%, more preferably more than 30%, even more preferably between 30% and 60%, most preferably between 30% and 50%. The alkyl sulfate anionic surfactant can comprise at least 5%, preferably at least 10%, most preferably at least 25%, by weight of the alkyl sulfate anionic surfactant, of branching on the C2 position (as measured counting carbon atoms from the sulfate group for non-alkoxylated alkyl sulfate anionic surfactants, and the counting from the alkoxy-group furthest from the sulfate group for alkoxylated alkyl sulfate anionic surfactants). More preferably, greater than 75%, even more preferably greater than 90%, by weight of the total branched alkyl content consists of C1-C5 alkyl moiety, preferably C1-C2 alkyl moiety. It has been found that formulating the inventive compositions using alkyl sulfate surfactants having the aforementioned degree of branching results in improved low temperature stability. Such compositions require less solvent in order to achieve good physical stability at low temperatures. As such, the compositions can comprise lower levels of organic solvent, of less than 5.0% by weight of the cleaning composition of organic solvent, while still having improved low temperature stability. Higher surfactant branching also provides faster initial suds generation, but typically less suds mileage. The weight average branching, described herein, has been found to provide improved low temperature stability, initial foam generation and suds longevity.

The weight average degree of branching for an anionic surfactant mixture can be calculated using the following formula:

$$\text{Weight average degree of branching (\%)}=[(x1*\text{wt \% branched alcohol 1 in alcohol 1}+x2*\text{wt \% branched alcohol 2 in alcohol 2}+\ldots)/(x1+x2+\ldots)]*100$$

wherein x1, x2, . . . are the weight in grams of each alcohol in the total alcohol mixture of the alcohols which were used as starting material before (alkoxylation and) sulfation to produce the alkyl (alkoxy) sulfate anionic surfactant. In the weight average degree of branching calculation, the weight of the alkyl alcohol used to form the alkyl sulfate anionic surfactant which is not branched is included.

The weight average degree of branching and the distribution of branching can typically be obtained from the technical data sheet for the surfactant or constituent alkyl alcohol. Alternatively, the branching can also be determined through analytical methods known in the art, including capillary gas chromatography with flame ionisation detection on medium polar capillary column, using hexane as the solvent. The weight average degree of branching and the distribution of branching is based on the starting alcohol used to produce the alkyl sulfate anionic surfactant.

Suitable counterions include alkali metal cation earth alkali metal cation, alkanolammonium or ammonium or substituted ammonium, but preferably sodium.

Suitable examples of commercially available alkyl sulfate anionic surfactants include, those derived from alcohols sold under the Neodol® brand-name by Shell, or the Lial®, Isalchem®, and Safol® brand-names by Sasol, or some of the natural alcohols produced by The Procter & Gamble Chemicals company. The alcohols can be blended in order to achieve the desired mol fraction of C12 and C13 chains and the desired C13/C12 ratio, based on the relative fractions of C13 and C12 within the starting alcohols, as obtained from the technical data sheets from the suppliers or from analysis using methods known in the art.

The performance can be affected by the width of the alkoxylation distribution of the alkoxylated alkyl sulfate anionic surfactant, including grease cleaning, sudsing, low temperature stability and viscosity of the finished product. The alkoxylation distribution, including its broadness can be varied through the selection of catalyst and process conditions when making the alkoxylated alkyl sulfate anionic surfactant.

Without wishing to be bound theory, through tight control of processing conditions and feedstock material compositions, both during alkoxylation especially ethoxylation and sulfation steps, the amount of 1,4-dioxane by-product within alkoxylated especially ethoxylated alkyl sulphates can be kept minimal. A further reduction of 1,4-dioxane by-product can be achieved by a consequent 1,4-dioxane stripping, distillation, evaporation, centrifugation, microwave irradiation, molecular sieving or catalytic or enzymatic degradation step. Processes to control 1,4-dioxane content within alkoxylated/ethoxylated alkyl sulphates have been described extensively in the art. Alternatively 1,4-dioxane level control within detergent formulations has also been described in the art through addition of 1,4-dioxane inhibitors to 1,4-dioxane comprising formulations, such as 5, 6-dihydro-3-(4-morpholinyl)-1-[4-(2-oxo-1-piperidinyl) phenyl]-2 (1H)-pyridone, 3 a-hydroxy-7-oxo-mixture of cholanic acid, 3-(N-methyl amino)-L-alanine, and mixtures thereof. Tight 1,4-dioxane control across the raw material and detergent making process enables product formulations with remaining 1,4-dioxane content of below 10 ppm, preferably below 5 ppm, even more preferably below 1 ppm.

The surfactant system may comprise further anionic surfactant, including sulfonate such as HLAS, or sulfosuccinate anionic surfactants. However, the composition preferably comprises less than 30%, preferably less than 15%, more preferably less than 10% by weight of the surfactant system of further anionic surfactant. Most preferably, the surfactant system comprises no further anionic surfactant, other than the alkyl sulfate anionic surfactant.

Co-Surfactant

The composition further comprises a co-surfactant selected from the group consisting of an amphoteric surfactant, a zwitterionic surfactant and mixtures thereof, as part of the surfactant system. The composition preferably comprises from 0.1% to 20%, more preferably from 0.5% to 15% and especially from 2% to 10% by weight of the cleaning composition of the co-surfactant.

The surfactant system of the cleaning composition of the present invention preferably comprises from 10% to 40%, preferably from 15% to 35%, more preferably from 20% to 30%, by weight of the surfactant system of a co-surfactant.

The co-surfactant is selected from the group consisting of an amphoteric surfactant, a zwitterionic surfactant, and mixtures thereof. The co-surfactant is preferably an amphoteric surfactant, more preferably an amine oxide surfactant.

The amine oxide surfactant can be linear or branched, though linear are preferred. Suitable linear amine oxides are typically water-soluble, and characterized by the formula R1-N(R2)(R3) O wherein R1 is a C8-18 alkyl, and the R2 and R3 moieties are selected from the group consisting of C1-3 alkyl groups, C1-3 hydroxyalkyl groups, and mixtures thereof. For instance, R2 and R3 can be selected from the group consisting of: methyl, ethyl, propyl, isopropyl, 2-hydroxethyl, 2-hydroxypropyl and 3-hydroxypropyl, and mixtures thereof, though methyl is preferred for one or both of R2 and R3. The linear amine oxide surfactants in particular may include linear C10-C18 alkyl dimethyl amine oxides and linear C8-C12 alkoxy ethyl dihydroxy ethyl amine oxides.

Preferably, the amine oxide surfactant is selected from the group consisting of: alkyl dimethyl amine oxide, alkyl amido propyl dimethyl amine oxide, and mixtures thereof. Alkyl dimethyl amine oxides are preferred, such as C8-18 alkyl dimethyl amine oxides, or C10-16 alkyl dimethyl amine oxides (such as coco dimethyl amine oxide). Suitable alkyl dimethyl amine oxides include C10 alkyl dimethyl amine oxide surfactant, C10-12 alkyl dimethyl amine oxide surfactant, C12-C14 alkyl dimethyl amine oxide surfactant, and mixtures thereof. C12-C14 alkyl dimethyl amine oxide are particularly preferred.

Alternative suitable amine oxide surfactants include mid-branched amine oxide surfactants. As used herein, "mid-branched" means that the amine oxide has one alkyl moiety having n1 carbon atoms with one alkyl branch on the alkyl moiety having n2 carbon atoms. The alkyl branch is located on the α carbon from the nitrogen on the alkyl moiety. This type of branching for the amine oxide is also known in the art as an internal amine oxide. The total sum of n1 and n2 can be from 10 to 24 carbon atoms, preferably from 12 to 20, and more preferably from 10 to 16. The number of carbon atoms for the one alkyl moiety (n1) is preferably the same or similar to the number of carbon atoms as the one alkyl branch (n2) such that the one alkyl moiety and the one alkyl branch are symmetric. As used herein "symmetric" means that $|n1-n2|$ is less than or equal to 5, preferably 4, most preferably from 0 to 4 carbon atoms in at least 50 wt %, more preferably at least 75 wt % to 100 wt % of the mid-branched amine oxides for use herein. The amine oxide further comprises two moieties, independently selected from a C1-3 alkyl, a C1-3 hydroxyalkyl group, or a polyethylene oxide group containing an average of from about 1 to about 3 ethylene oxide groups. Preferably, the two moieties are selected from a C1-3 alkyl, more preferably both are selected as C1 alkyl.

Alternatively, the amine oxide surfactant can be a mixture of amine oxides comprising a mixture of low-cut amine oxide and mid-cut amine oxide. The amine oxide of the composition of the invention can then comprises:

a) from about 10% to about 45% by weight of the amine oxide of low-cut amine oxide of formula R1R2R3AO wherein R1 and R2 are independently selected from hydrogen, C1-C4 alkyls or mixtures thereof, and R3 is selected from C10 alkyls and mixtures thereof; and b) from 55% to 90% by weight of the amine oxide of mid-cut amine oxide of formula R4R5R6AO wherein R4 and R5 are independently selected from hydrogen, C1-C4 alkyls or mixtures thereof, and R6 is selected from C12-C16 alkyls or mixtures thereof In a preferred low-cut amine oxide for use herein R3 is n-decyl, with preferably both R1 and R2 being methyl. In the mid-cut amine oxide of formula R4R5R6AO, R4 and R5 are preferably both methyl.

Preferably, the amine oxide comprises less than about 5%, more preferably less than 3%, by weight of the amine oxide of an amine oxide of formula R7R8R9AO wherein R7 and R8 are selected from hydrogen, C1-C4 alkyls and mixtures thereof and wherein R9 is selected from C8 alkyls and mixtures thereof. Limiting the amount of amine oxides of formula R7R8R9AO improves both physical stability and suds mileage.

Suitable zwitterionic surfactants include betaine surfactants. Such betaine surfactants includes alkyl betaines, alkylamidobetaine, amidazoliniumbetaine, sulfobetaine (INCI Sultaines) as well as the Phosphobetaine, and preferably meets formula (I):

$$R^1—[CO—X(CH_2)_n]_x—N^+(R^2)R_3)—(CH_2)_m—[CH(OH)—CH_2]_y—Y— \quad (I)$$

Wherein in formula (I),

R1 is selected from the group consisting of: a saturated or unsaturated C6-22 alkyl residue, preferably C8-18 alkyl residue, more preferably a saturated C10-16 alkyl residue, most preferably a saturated C12-14 alkyl residue;

X is selected from the group consisting of: NH, NR4 wherein R4 is a C1-4 alkyl residue, O, and S, n is an integer from 1 to 10, preferably 2 to 5, more preferably 3, x is 0 or 1, preferably 1, R2 and R3 are independently selected from the group consisting of: a C1-4 alkyl residue, hydroxy substituted such as a hydroxyethyl, and mixtures thereof, preferably both R2 and R3 are methyl, m is an integer from 1 to 4, preferably 1, 2 or 3, y is 0 or 1, and Y is selected from the group consisting of: COO, SO3, OPO(OR5)O or P(O)(OR5)O, wherein R5 is H or a C1-4 alkyl residue.

Preferred betaines are the alkyl betaines of formula (Ia), the alkyl amido propyl betaine of formula (Ib), the sulfo betaines of formula (Ic) and the amido sulfobetaine of formula (Id):

$$R^1—N(CH_3)_2—CH_2COO— \quad (Ia)$$

$$R^1—CO—NH(CH_2)_3—N^+(CH_3)_2—CH_2COO— \quad (Ib)$$

$$R^1—N^+(CH_3)_2—CH_2Ch(OH)CH_2SO_3— \quad (Ic)$$

$$R^1—CO—NH—(CH_2)_3—N^+(CH_3)_2—CH_2CH(OH)CH_2SO_3— \quad (Id)$$

in which R1 has the same meaning as in formula (I). Particularly preferred are the carbobetaines [i.e. wherein Y—=COO— in formula (I)] of formulae (Ia) and (Ib), more preferred are the alkylamidobetaine of formula (Ib).

Suitable betaines can be selected from the group consisting or [designated in accordance with INCI]: capryl/capramidopropyl betaine, cetyl betaine, cetyl amidopropyl betaine, cocamidoethyl betaine, cocamidopropyl betaine, cocobetaines, decyl betaine, decyl amidopropyl betaine, hydrogenated tallow betaine/amidopropyl betaine, isostearamidopropyl betaine, lauramidopropyl betaine, lauryl betaine, myristyl amidopropyl betaine, myristyl betaine, oleamidopropyl betaine, oleyl betaine, palmamidopropyl betaine, palmitamidopropyl betaine, palm-kernelamidopropyl betaine, stearamidopropyl betaine, stearyl betaine, tallowamidopropyl betaine, tallow betaine, undecylenamidopropyl betaine, undecyl betaine, and mixtures thereof. Preferred betaines are selected from the group consisting of: cocamidopropyl betaine, cocobetaines, lauramidopropyl betaine, lauryl betaine, myristyl amidopropyl betaine, myristyl betaine, and mixtures thereof. Cocamidopropyl betaine is particularly preferred.

Nonionic Surfactant:

Alkoxylated Non-Ionic Surfactant:

Preferably, the surfactant system of the composition of the present invention further comprises from 1% to 25%, preferably from 1.25% to 20%, more preferably from 1.5% to 15%, most preferably from 1.5% to 5%, by weight of the surfactant system, of an alkoxylated non-ionic surfactant.

Preferably, the alkoxylated non-ionic surfactant is a linear or branched, primary or secondary alkyl alkoxylated non-ionic surfactant, preferably an alkyl ethoxylated non-ionic surfactant, preferably comprising on average from 9 to 15, preferably from 10 to 14 carbon atoms in its alkyl chain and on average from 5 to 12, preferably from 6 to 10, most preferably from 7 to 8, units of ethylene oxide per mole of alcohol.

Alkyl Polyglucoside Nonionic Surfactant:

The compositions of the present invention can comprise alkyl polyglucoside ("APG") surfactant. The addition of alkyl polyglucoside surfactants have been found to improve sudsing beyond that of comparative nonionic surfactants such as alkyl ethoxylated surfactants. If present, the alkyl polyglucoside can be present in the surfactant system at a level of from 0.5% to 20%, preferably from 0.75% to 15%, more preferably from 1% to 10%, most preferably from 1% to 5% by weight of the surfactant composition. Preferably the alkyl polyglucoside surfactant is a C8-C16 alkyl polyglucoside surfactant, preferably a C8-C14 alkyl polyglucoside surfactant. The alkyl polyglucoside preferably has an average degree of polymerization of between 0.1 and 3, more preferably between 0.5 and 2.5, even more preferably between 1 and 2. Most preferably, the alkyl polyglucoside surfactant has an average alkyl carbon chain length between 10 and 16, preferably between 10 and 14, most preferably between 12 and 14, with an average degree of polymerization of between 0.5 and 2.5 preferably between 1 and 2, most preferably between 1.2 and 1.6. C8-C16 alkyl polyglucosides are commercially available from several suppliers (e.g., Simusol®) surfactants from Seppic Corporation; and Glucopon® 600 CSUP, Glucopon® 650 EC, Glucopon® 600 CSUP/MB, and Glucopon® 650 EC/MB, from BASF Corporation).

Suitable surfactant systems can comprise:

i) from 70% to 79% by weight of the surfactant system of an alkoxy ethoxy sulfate surfactant;

ii) from 20% to 30% by weight of the surfactant system of an amine oxide surfactant; and iii) from 1% to 5% by weight of the surfactant system of an alkyl polyglucoside surfactant.

Amphiphilic Alkoxylated Polyalkyleneimine:

The composition of the present invention may further comprise from about 0.05% to about 2%, preferably from about 0.07% to about 1% by weight of the total composition of an amphiphilic polymer. Suitable amphiphilic polymers can be selected from the group consisting of: amphiphilic alkoxylated polyalkyleneimine and mixtures thereof. The amphiphilic alkoxylated polyalkyleneimine polymer has been found to reduce gel formation on the hard surfaces to be cleaned when the liquid composition is added directly to a cleaning implement (such as a sponge) before cleaning and consequently brought in contact with heavily greased surfaces, especially when the cleaning implement comprises a low amount to nil water such as when light pre-wetted sponges are used.

Preferably, the amphiphilic alkoxylated polyalkyleneimine is an alkoxylated polyethyleneimine polymer comprising a polyethyleneimine backbone having a weight average molecular weight range of from 100 to 5,000, preferably from 400 to 2,000, more preferably from 400 to 1,000 Daltons. The polyethyleneimine backbone comprises the following modifications:

(i) one or two alkoxylation modifications per nitrogen atom, dependent on whether the modification occurs at an internal nitrogen atom or at an terminal nitrogen atom, in the polyethyleneimine backbone, the alkoxylation modification consisting of the replacement of a hydrogen atom on by a polyalkoxylene chain having an average of about 1 to about 50 alkoxy moieties per modification, wherein the terminal alkoxy moiety of the alkoxylation modification is capped with hydrogen, a C1-C4 alkyl or mixtures thereof;

(ii) a substitution of one C1-C4 alkyl moiety and one or two alkoxylation modifications per nitrogen atom, dependent on whether the substitution occurs at a internal nitrogen atom or at an terminal nitrogen atom, in the polyethyleneimine backbone, the alkoxylation modification consisting of the replacement of a hydrogen atom by a polyalkoxylene chain having an average of about 1 to about 50 alkoxy moieties per modification wherein the terminal alkoxy moiety is capped with hydrogen, a C1-C4 alkyl or mixtures thereof; or (iii) a combination thereof.

For example, but not limited to, below is shown possible modifications to terminal nitrogen atoms in the polyethyleneimine backbone where R represents an ethylene spacer and E represents a C1-C4 alkyl moiety and X− represents a suitable water soluble counterion:

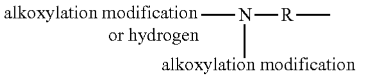

or

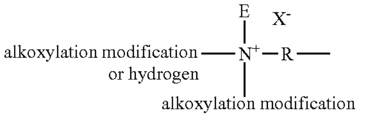

Also, for example, but not limited to, below is shown possible modifications to internal nitrogen atoms in the polyethyleneimine backbone where R represents an ethylene spacer and E represents a $C_1$-$C_4$ alkyl moiety and X− represents a suitable water soluble counterion:

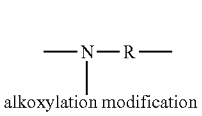

or

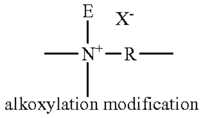

The alkoxylation modification of the polyethyleneimine backbone consists of the replacement of a hydrogen atom by a polyalkoxylene chain having an average of about 1 to about 50 alkoxy moieties, preferably from about 20 to about 45 alkoxy moieties, most preferably from about 30 to about 45 alkoxy moieties. The alkoxy moieties are selected from ethoxy (EO), propoxy (PO), butoxy (BO), and mixtures thereof. Alkoxy moieties solely comprising ethoxy units are outside the scope of use for the invention though. Preferably, the polyalkoxylene chain is selected from ethoxy/propoxy block moieties. More preferably, the polyalkoxylene chain is ethoxy/propoxy block moieties having an average degree of ethoxylation from about 3 to about 30 and an average degree of propoxylation from about 1 to about 20, more preferably ethoxy/propoxy block moieties having an average degree of ethoxylation from about 20 to about 30 and an average degree of propoxylation from about 10 to about 20.

More preferably the ethoxy/propoxy block moieties have a relative ethoxy to propoxy unit ratio between 3 to 1 and 1 to 1, preferably between 2 to 1 and 1 to 1. Most preferably the polyalkoxylene chain is the ethoxy/propoxy block moieties wherein the propoxy moiety block is the terminal alkoxy moiety block.

The modification may result in permanent quaternization of the polyethyleneimine backbone nitrogen atoms. The degree of permanent quaternization may be from 0% to about 30% of the polyethyleneimine backbone nitrogen atoms. It is preferred to have less than 30% of the polyethyleneimine backbone nitrogen atoms permanently quaternized. Most preferably the degree of quaternization is about 0%.

A preferred amphiphilic alkoxylated polyethyleneimine polymner has the general structure of formula (II):

(II)

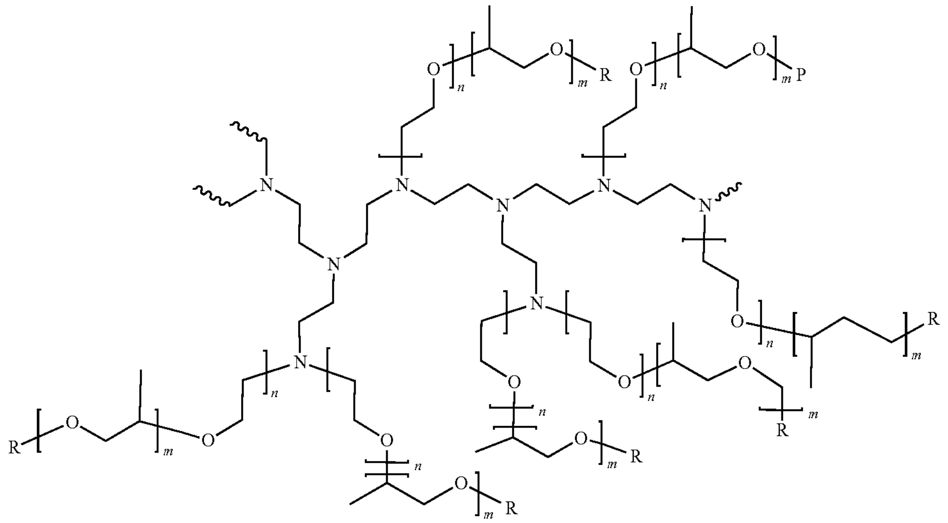

wherein the polyethyleneimine backbone has a weight average molecular weight of about 600, n of formula (II) has an average of about 10, m of formula (II) has an average of about 7 and R of formula (II) is selected from hydrogen, a $C_1$-$C_4$ alkyl and mixtures thereof, preferably hydrogen. The degree of permanent quaternization of formula (II) may be from 0% to about 22% of the polyethyleneimine backbone nitrogen atoms. The molecular weight of this amphiphilic alkoxylated polyethyleneimine polymer preferably is between 10,000 and 15,000 Da.

More preferably, the amphiphilic alkoxylated polyethyleneimine polymer has the general structure of formula (II) but wherein the polyethyleneimine backbone has a weight average molecular weight of about 600 Da, n of Formula (II) has an average of about 24, m of Formula (II) has an average of about 16 and R of Formula (II) is selected from hydrogen, a $C_1$-$C_4$ alkyl and mixtures thereof, preferably hydrogen. The degree of permanent quaternization of Formula (II) may be from 0% to about 22% of the polyethyleneimine backbone nitrogen atoms, and is preferably 0%. The molecular weight of this amphiphilic alkoxylated polyethyleneimine polymer preferably is between 25,000 and 30,000, most preferably 28,000 Da.

The amphiphilic alkoxylated polyethyleneimine polymers can be made by the methods described in more detail in PCT Publication No. WO 2007/135645.

Cyclic Polyamine

The composition can comprise a cyclic polyamine having amine functionalities that helps cleaning. The composition of the invention preferably comprises from about 0.1% to about 3%, more preferably from about 0.2% to about 2%, and especially from about 0.5% to about 1%, by weight of the composition, of the cyclic polyamine.

The amine can be subjected to protonation depending on the pH of the cleaning medium in which it is used. Preferred cyclic polyamines have the following Formula (III):

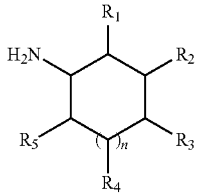

wherein $R_1$, R2, R3, R4 and R5 are independently selected from the group consisting of $NH_2$, —H, linear or branched alkyl having from about 1 to about 10 carbon atoms, and linear or branched alkenyl having from about 1 to about 10 carbon atoms, n is from about 1 to about 3, preferably n is 1, and wherein at least one of the Rs is NH2 and the remaining "Rs" are independently selected from the group consisting of NH2, —H, linear or branched alkyl having about 1 to about 10 carbon atoms, and linear or branched alkenyl having from about 1 to about 10 carbon atoms. Preferably, the cyclic polyamine is a diamine, wherein n is 1, $R_2$ is NH2, and at least one of $R_1$, $R_3$, $R_4$ and $R_5$ is CH3 and the remaining Rs are H.

The cyclic polyamine has at least two primary amine functionalities. The primary amines can be in any position in the cyclic amine but it has been found that in terms of grease cleaning, better performance is obtained when the primary amines are in positions 1,3. It has also been found that cyclic amines in which one of the substituents is —CH3 and the rest are H provided for improved grease cleaning performance.

Accordingly, the most preferred cyclic polyamine for use with the cleaning composition of the present invention are cyclic polyamine selected from the group consisting of: 2-methylcyclohexane-1,3-diamine, 4-methylcyclohexane-1,3-diamine and mixtures thereof. These specific cyclic polyamines work to improve suds and grease cleaning profile through-out the dishwashing process when formulated together with the surfactant system of the composition of the present invention.

Additional Ingredients:

The composition of the present invention may further comprise at least one active selected from the group consisting of: i) a salt, ii) a hydrotrope, iii) an organic solvent, and mixtures thereof Salt:

The composition of the present invention may comprise from about 0.05% to about 2%, preferably from about 0.1% to about 1.5%, or more preferably from about 0.5% to about 1%, by weight of the total composition of a salt, preferably a monovalent or divalent inorganic salt, or a mixture thereof, more preferably selected from: sodium chloride, sodium sulfate, and mixtures thereof. Sodium chloride is most preferred.

Hydrotrope:

The composition of the present invention may comprise from about 0.1% to about 10%, or preferably from about 0.5% to about 10%, or more preferably from about 1% to about 10% by weight of the total composition of a hydrotrope or a mixture thereof, preferably sodium cumene sulfonate.

Organic Solvent:

The composition can comprise from about 0.1% to about 10%, or preferably from about 0.5% to about 10%, or more preferably from about 1% to about 10% by weight of the total composition of an organic solvent. Suitable organic solvents include organic solvents selected from the group consisting of: alcohols, glycols, glycol ethers, and mixtures thereof, preferably alcohols, glycols, and mixtures thereof. Ethanol is the preferred alcohol. Polyalkyleneglycols, especially polypropyleneglycol, is the preferred glycol.

Adjunct Ingredients

The cleaning composition may optionally comprise a number of other adjunct ingredients such as builders (preferably citrate), chelants, conditioning polymers, other cleaning polymers, surface modifying polymers, structurants, emollients, humectants, skin rejuvenating actives, enzymes, carboxylic acids, scrubbing particles, perfumes, malodor control agents, pigments, dyes, opacifiers, pearlescent particles, inorganic cations such as alkaline earth metals such as Ca/Mg-ions, antibacterial agents, preservatives, viscosity adjusters (e.g., salt such as NaCl, and other mono-, di- and trivalent salts) and pH adjusters and buffering means (e.g. carboxylic acids such as citric acid, HCl, NaOH, KOH, alkanolamines, carbonates such as sodium carbonates, bicarbonates, sesquicarbonates, and alike).

Method of Washing

The invention is further directed to a method of manually washing dishware with the composition of the present invention. The method comprises the steps of delivering a composition of the present invention to a volume of water to form a wash solution and immersing the dishware in the solution. The dishware is be cleaned with the composition in the presence of water.

Optionally, the dishware can be rinsed. By "rinsing", it is meant herein contacting the dishware cleaned with the process according to the present invention with substantial quantities of appropriate solvent, typically water. By "substantial quantities", it is meant usually about 1 to about 20 L, or under running water.

The composition herein can be applied in its diluted form. Soiled dishware are contacted with an effective amount, typically from about 0.5 mL to about 20 mL (per about 25 dishes being treated), preferably from about 3 mL to about 10 mL, of the cleaning composition, preferably in liquid form, of the present invention diluted in water. The actual amount of cleaning composition used will be based on the judgment of the user, and will typically depend upon factors such as the particular product formulation of the cleaning composition, including the concentration of active ingredients in the cleaning composition, the number of soiled dishes to be cleaned, the degree of soiling on the dishes, and the like. Generally, from about 0.01 mL to about 150 mL, preferably from about 3 mL to about 40 mL of a cleaning composition of the invention is combined with from about 2,000 mL to about 20,000 mL, more typically from about 5,000 mL to about 15,000 mL of water in a sink. The soiled dishware are immersed in the sink containing the diluted cleaning compositions then obtained, before contacting the soiled surface of the dishware with a cloth, sponge, or similar cleaning implement. The cloth, sponge, or similar cleaning implement may be immersed in the cleaning composition and water mixture prior to being contacted with the dishware, and is typically contacted with the dishware for a period of time ranged from about 1 to about 10 seconds, although the actual time will vary with each application and user. The contacting of cloth, sponge, or similar cleaning implement to the dishware is accompanied by a concurrent scrubbing of the dishware.

Another aspect of the present invention is directed to use of a hand dishwashing cleaning composition of the present invention for providing good sudsing profile, including suds stabilization in the presence of greasy and/or particulate soils.

Test Methods

The following assays set forth must be used in order that the invention described and claimed herein may be more fully understood.

Test Method 1: Suds Mileage Test

The objective of the Suds Mileage Test is to compare the evolution over time of suds volume generated for different test formulations at specified water hardness, solution temperatures and formulation concentrations, while under the influence of periodic soil injections. Data are compared and expressed versus a reference composition as a suds mileage index (reference composition has suds mileage index of 100). The steps of the method are as follows:

1. A defined amount of a test composition, depending on the targeted composition concentration (here: 0.12 wt %), is dispensed through a plastic pipette at a flow rate of 0.67 mL/sec at a height of 37 cm above the bottom surface of a sink (dimension: 300 mm diameter and 288 mm height) into a water stream (here: water hardness: 2, 7, 15 gpg, water temperature: 42° C.) that is filling up the sink to 4 L with a constant pressure of 4 bar.
2. An initial suds volume generated (measured as average foam height X sink surface area and expressed in $cm^3$) is recorded immediately after end of filling.

3. A fixed amount (6 mL) of a soil with defined composition as below is immediately injected into the middle of the sink.
4. The resultant solution is mixed with a metal blade (10 cm×5 cm) positioned in the middle of the sink at the air liquid interface under an angle of 45 degrees rotating at 85 RPM for 20 revolutions.
5. Another measurement of the total suds volume is recorded immediately after end of blade rotation.
6. Steps 3-5 are repeated until the measured total suds volume reaches a minimum level of 400 $cm^3$. The amount of added soil that is needed to get to the 400 $cm^3$ level is considered as the suds mileage for the test composition.
7. Each test composition is tested 4 times per testing condition (i.e., water temperature, composition concentration, water hardness, soil type).
8. The average suds mileage is calculated as the average of the 4 replicates for each sample for a defined test condition.
9. Calculate a Suds Mileage Index by comparing the average mileage of a test composition sample versus a reference composition sample. The calculation is as follows:

$$\text{Suds Mileage Index} = \frac{\text{Average number of soil additions of test composition}}{\text{Average number of soil additions of reference composition}} \times 100$$

Soil compositions are produced through standard mixing of the components described in Tables 1 and 2.

TABLE 1

| Greasy Soil | |
|---|---|
| Ingredient | Weight % |
| Crisco Oil | 12.730 |
| Crisco shortening | 27.752 |
| Lard | 7.638 |
| Refined Rendered Edible Beef Tallow | 51.684 |
| Oleic Acid, 90% (Techn) | 0.139 |
| Palmitic Acid, 99+% | 0.036 |
| Stearic Acid, 99+% | 0.021 |

TABLE 2

| Particulate Soil | |
|---|---|
| Ingredient | Weight % |
| Zwan Flemish Carbonades | 22.67 |
| Beaten Eggs | 4.78 |
| Smash Instant Mash Potato | 9.26 |
| McDougall's Sponge Mix | 3.30 |
| Milk UHT Full Cream | 22.22 |
| Bisto Gravy Granules | 1.30 |
| Mazola ® Pure Corn Oil | 9.29 |
| Demineralized water | 26.32 |
| Sodium Benzoate | 0.42 |
| Potassium Sorbate | 0.42 |

Example

The following examples are provided to further illustrate the present invention and are not to be construed as limitations of the present invention, as many variations of the present invention are possible without departing from its scope.

Example 1: Inventive and Comparative Compositions

The ability of cleaning compositions to improve their suds mileage was assessed for the cleaning composition having a C13/C12 alkyl (ethoxy) sulfate mol-ratio according to the invention (Inventive Compositions 1—65.6/34.4) and the composition outside the scope of the invention (Comparative Composition 1—50.7/49.3). The compositions were produced through standard mixing of the components described in Table 3. The C23AE0.6S alkyl sulfate anionic surfactant has been achieved by pre-mixing the starting alcohol/alcohol ethoxylate blend as tabulated below, followed by a standard sulfation process using sulfur trioxide, as is known in the art.

TABLE 3

| Inventive and Comparative Compositions | | |
|---|---|---|
| Wt % | Inventive Comp. 1 | Comparative Comp. 1 |
| Total surfactant | 29.01% | 29.01% |
| C23AE0.6S | 22.84 | 22.84 |
| C12-14 Dimethyl Amine Oxide | 6.17 | 6.17 |
| NaCl | 0.9 | 0.9 |
| Polypropylene Glycol (MW 2000) | 1.05 | 1.05 |
| Ethanol | 2.6 | 2.6 |
| Alkoxylated polyethyleneimine (PEI600EO24PO16) | 0.276 | 0.276 |
| Water + Minor ingredients (perfume, dye, preservatives) | Balance to 100% | Balance to 100% |
| pH (at 10% product concentration in demineralized water-through NaOH) | 9.0 | 9.0 |
| AES characteristics | | |
| AES: starting alcohol/alcohol ethoxylate blend composition (wt % of alcohol/alcohol ethoxylate blend) | 30.9% Safol A<br>26.8% Neodol 3A<br>12.7% Neodol 23A<br>29.6% Safol AE3 | 30.9% Safol A<br>0% Neodol 3A<br>39.5% Neodol 23A<br>29.6% Safol AE3 |
| Avg. wt % degree of AES branching | 35.6% | 35.6% |
| Avg degree of ethoxylation | 0.6 | 0.6 |
| C13-C12 ABS mol-ratio | 65.6/34.4 | 50.7/49.3 |
| Alkyl chain length distribution (C12/13/14) | 34.25%/65.20%/ 0.55% | 50.50%/49.10%/ 0.4% |
| AS/AES mol-ratio | 85/15 | 85/15 |

Example 1a: Suds Mileage Index of Inventive and Comparative Compositions

The resultant compositions including the Inventive Compositions 1 and Comparative Compositions 1 were assessed using the Suds Mileage Index test method as described herein. Averaged Suds Mileage Index results across the water hardness's tested are summarized in Table 4. The higher the Suds Mileage Index value, the better in maintaining suds mileage. From the data it can be concluded that Inventive Composition 1 has a stronger suds robustness in the presence of greasy soils in comparison to Comparative Composition 1, while not compromising suds robustness in the presence of particulate soils.

TABLE 4

Suds Mileage Index Results of Inventive and Comparative Compositions

| | Inventive Comp. 1 | Comparative Comp. 1 |
|---|---|---|
| Suds Mileage Index (Greasy soil) | 106 | 100 |
| Suds Mileage Index (Particulate soil) | 100 | 100 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A liquid hand dishwashing cleaning composition comprising from about 5% to about 50% by weight of the total composition of a surfactant system, wherein the surfactant system comprises:

i) from about 60% to about 90% by weight of the surfactant system of an alkoxylated alkyl sulfate with an average degree of alkoxylation of more than about 0.5 and less than about 5; and ii) a co-surfactant selected from the group consisting of an amphoteric surfactant, a zwitterionic surfactant and mixtures thereof;

wherein the alkyl chain of the alkoxylated alkyl sulfate has a mol fraction of C12 and C13 chains of at least about 50%, and wherein the C13/C12 mol ratio of the alkyl chain of the alkoxylated alkyl sulfate is at least about 65/35 to 80/20.

2. The composition according to claim 1, wherein the alkyl chain of the alkoxylated alkyl sulfate has a mol fraction of C12 and C13 chains of at least about 80%.

3. The composition according to claim 1, wherein the liquid hand dishwashing cleaning composition comprising from about 8% to about 45%, by weight of the total composition of the surfactant system.

4. The composition according to claim 1, wherein the weight ratio of the alkoxylated alkyl sulfate to the co-surfactant is from about 1:1 to about 8:1.

5. The composition according to claim 4, wherein the weight ratio of the alkoxylated alkyl sulphate to the co-surfactant is from about 2.5:1 to about 4:1.

6. The composition according to claim 1, wherein the average alkyl chain length of the alkoxylated alkyl sulfate is from about 8 to about 18 carbon atoms.

7. The composition according to claim 6, wherein the average alkyl chain length of the alkoxylated alkyl sulfate is from about 12 to about 14 carbon atoms.

8. The composition according to claim 1, wherein the alkoxylated alkyl sulfate has an average degree of alkoxylation of less than about 2 and more than about 0.5.

9. The composition according to claim 1, wherein the alkoxylated alkyl sulfate has a weight average degree of branching of more than about 10%.

10. The composition according to claim 9, wherein the alkoxylated alkyl sulfate has a weight average degree of branching of between 30% and 50%.

11. The composition according to claim 9, wherein the alkoxylated alkyl sulfate comprises at least about 10% by weight of the alkyl sulfate anionic surfactant, of branching on the C2 position.

12. The composition according to claim 1, wherein the surfactant system comprises less than about 10% of further anionic surfactant.

13. The composition according to claim 12, wherein the surfactant system comprises no further anionic surfactant.

14. The composition according to claim 1, wherein the co-surfactant is an amphoteric surfactant.

15. The composition according to claim 14, wherein the co-surfactant is an amine oxide surfactant.

16. The composition according to claim 15, wherein the amine oxide surfactant is selected from the group consisting of alkyl dimethyl amine oxide, alkyl amido propyl dimethyl amine oxide, and mixtures thereof.

17. The composition according to claim 1, further comprising from about 0.05% to about 2% by weight of the total composition of an amphiphilic alkoxylated polyalkyleneimine and mixtures thereof, wherein the amphiphilic alkoxylated polyalkyleneimine is an alkoxylated polyethyleneimine polymer comprising a polyethyleneimine backbone having a weight average molecular weight range of from about 100 to about 5,000 Daltons, and the alkoxylated polyethyleneimine polymer comprises the following modifications:

i) one or two alkoxylation modifications per nitrogen atom, dependent on whether the modification occurs at an internal nitrogen atom or at an terminal nitrogen atom, in the polyethyleneimine backbone, the alkoxylation modification consisting of the replacement of a hydrogen atom on by a polyalkoxylene chain having an average of about 1 to about 50 alkoxy moieties per modification, wherein the terminal alkoxy moiety of the alkoxylation modification is capped with hydrogen, a C1-C4 alkyl or mixtures thereof;

ii) a substitution of one C1-C4 alkyl moiety and one or two alkoxylation modifications per nitrogen atom, dependent on whether the substitution occurs at a internal nitrogen atom or at an terminal nitrogen atom, in the polyethyleneimine backbone, the alkoxylation modification consisting of the replacement of a hydrogen atom by a polyalkoxylene chain having an average of about 1 to about 50 alkoxy moieties per modification wherein the terminal alkoxy moiety is capped with hydrogen, a C1-C4 alkyl or mixtures thereof; or iii) a combination thereof; and wherein the alkoxy moieties are selected from ethoxy (EO), propoxy (PO), butoxy (BO), and mixtures thereof, with the proviso that the alkoxy moieties do not solely comprise ethoxy units, wherein the polyalkoxylene chain is ethoxy/propoxy block moieties having an average degree of ethoxylation from about 3 to about 30 and an average degree of propoxylation from about 1 to about 20.

18. A method of manually washing dishware comprising the steps of: delivering a composition according to claim 1 to a volume of water to form a wash solution and immersing the dishware in the solution.

* * * * *